M. H. Biddle,
Cage Trap.
№ 21,647.   Patented Oct. 5, 1858.
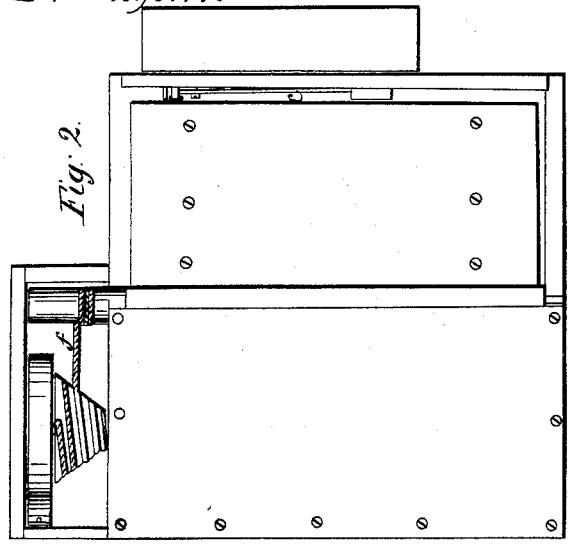
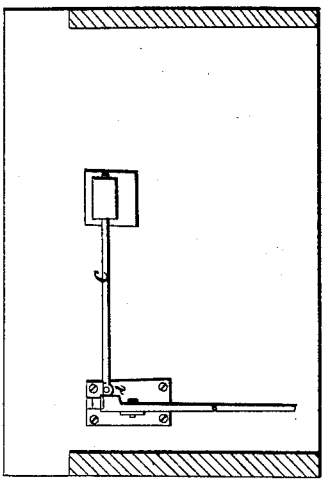
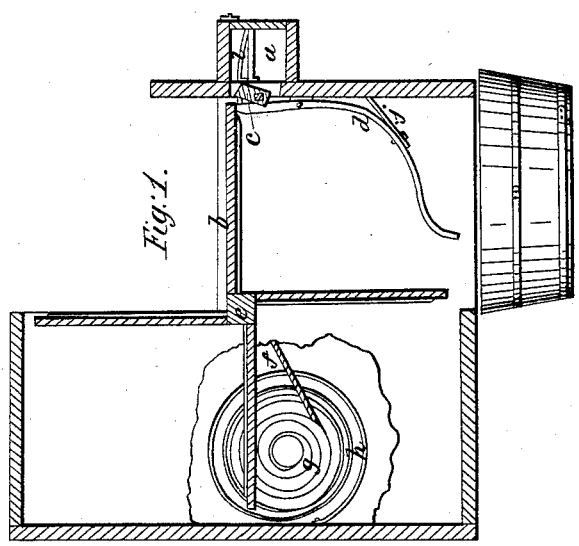

UNITED STATES PATENT OFFICE.

MOSES H. BIDDLE, OF MOUNT CARMEL, ILLINOIS.

CONSTRUCTION OF ANIMAL-TRAPS.

Specification of Letters Patent No. 21,647, dated October 5, 1858.

*To all whom it may concern:*

Be it known that I, MOSES H. BIDDLE, of Mount Carmel, in the county of Wabash and State of Illinois, have invented a new and Improved Rat-Trap; and I do hereby declare that the following is a full and exact description thereof, reference being had to the accompanying drawings and to the letters of reference marked thereon.

My invention relates to that class of traps, which is automatically reset in the act of entrapping the animal; and it consists in the peculiar arrangement and combination of the parts which effect this object.

Figure (1) is a cross-section of the trap, through the hole at which the rat seeks the bait, and showing, in section, the top, bottom, and sides, of the small box, in which the bait is placed; also, the revolving platform, on which the animal passed to get at the bait; also, the bar, which is depressed by the animal's nose, as he seeks the bait. On this figure is also shown, in projection, the curved catch $(d)$, which supports the platform, and the springs $(l)$ and $(j)$ which operate on the catch, also, the cord $(f)$, which is wound around the shaft of the revolving platform, and around the fusee pulley $(g)$, which is acted on by a helical spring $(h)$. Fig. (2) is a plan, or top view, of the trap, showing the position of the bait box, and the fusee pulley; also, the axis of the revolving platform. Fig. (3) is an inside view of the side next to the bait-box, showing the operation of the pivoted bar, which is depressed by the animal's nose, when he seeks the bait, and which releases the platform from the action of the spring catch $(d)$, by raising the spring $l$, which holds it in position.

In referring to the figures, $(a,)$ represents the box in which the bait is placed; $(b,)$ is one leaf of revolving platform; $(c)$ is the pivoted bar, which is depressed by the animal's nose when he seeks the bait; $(d)$ is the spring catch which supports the platform; $(e)$, is the axis of the revolving platforms, which support the animal when seeking the bait; $(f)$ is the cord, which is wound around the fusee pulley; and also, around the axis of the revolving platforms, to cause the platforms to revolve quickly as soon as the spring catch is disengaged.

$(g)$ is the fusee pulley, and $(h)$ is the helical spring, actuating the pulley; $(i)$ is the pivot upon which the spring catch turns; $(j)$ a spring forcing the lower part of the spring catch out from the side of the trap and $(l)$ is the detent, which is raised by the pivoted bar, when the platform is released.

The operation is as follows, viz: The trap being set, with the cord $(f)$ drawn tight, by the action of the helical spring on the pulley $(g)$; the platform $(b)$ presses firmly on the end of the spring catch $(d)$, when the animal passes upon it to reach the bait through a hole in the side between the platform and the bait-box; and it is firmly sustained, by the platform, until it reaches this hole; but, as soon as it tries to get at the bait, through this hole, the pivoted bar $(c)$ is depressed at this point and elevated at the opposite end which lifts the detent $(l)$, and disengages the upper end of the catch, the platform then revolves down quickly under the joint influence of the animal's weight and the action of the helical spring on the cord $(f)$; the rat falls into a receiver $(k)$, and as the platform passes down, it strikes the lower arm of the catch $(d)$ and forces out the end of the same above the pivot $(i)$; the spring detent $(l)$ then resumes its position, holding the spring catch in place, and the trap is reset. The same operation is renewed with every animal which seeks the bait in like manner.

Having thus described the nature of my invention, and the mode of operation of the several parts, I will state that I am aware that traps have been hitherto made with revolving platforms, which would set themselves, in the act of entrapping the animals: and that I do not claim, broadly, all traps with these distinctive features: but

What I do claim, is—

1. The combination and arrangement of the pivoted bar $(c)$, spring detent $(l)$, and the spring catch $(d)$, for the purpose set forth, and as above described.

2. I also claim the arrangement of the spring pulley $(g)$, cord $(f)$, and axis $(e)$ of the revolving platforms of a rat trap, in combination: for the purpose of effecting a prompt revolution of the platform as soon as the detent is disengaged.

In testimony of which invention I hereunto set my hand.

M. H. BIDDLE.

Attest:
 GEO. H. KNIGHT,
 OCT. KNIGHT.